(12) United States Patent
Lo (10) Patent No.: US 10,795,176 B2
(45) Date of Patent: Oct. 6, 2020

(54) THREE-DIMENSIONAL DISPLAY ADAPTED FOR VIEWERS WITH A DOMINANT EYE

(71) Applicant: 3DV Co. Ltd., Chai Wan (HK)

(72) Inventor: Kwok Wah Allen Lo, Causeway Bay (HK)

(73) Assignee: 3D MEDIA LTD, Chai Wan (HK)

( * ) Notice: Subject to any disclaimer, the term of this patent is extended or adjusted under 35 U.S.C. 154(b) by 36 days.

(21) Appl. No.: 16/111,320

(22) Filed: Aug. 24, 2018

(65) Prior Publication Data

US 2020/0064643 A1  Feb. 27, 2020

(51) Int. Cl.
  *H04N 13/31* (2018.01)
  *G02B 30/27* (2020.01)
  *H04N 13/354* (2018.01)
  *H04N 13/305* (2018.01)
  *G02B 30/26* (2020.01)
  *G02B 30/35* (2020.01)

(52) U.S. Cl.
  CPC ............. *G02B 30/27* (2020.01); *G02B 30/26* (2020.01); *G02B 30/35* (2020.01); *H04N 13/305* (2018.05); *H04N 13/31* (2018.05); *H04N 13/354* (2018.05)

(58) Field of Classification Search
  None
  See application file for complete search history.

(56) References Cited

U.S. PATENT DOCUMENTS

| 5,606,455 | A | * | 2/1997 | Eichenlaub | H04N 13/305 359/463 |
| 6,094,216 | A | * | 7/2000 | Taniguchi | G09G 3/003 348/51 |
| 7,619,815 | B2 | * | 11/2009 | Nam | G02B 30/27 359/464 |
| 2009/0096943 | A1 | * | 4/2009 | Uehara | G09G 3/3611 349/37 |
| 2010/0265284 | A1 | * | 10/2010 | Satou | G09G 3/003 345/697 |
| 2011/0063424 | A1 | * | 3/2011 | Matsuhiro | H04N 13/339 348/58 |
| 2011/0221750 | A1 | * | 9/2011 | Sato | H04N 13/315 345/419 |
| 2011/0234605 | A1 | * | 9/2011 | Smith | G02B 30/27 345/522 |
| 2013/0215343 | A1 | * | 8/2013 | Lo | H04N 13/324 349/15 |

(Continued)

FOREIGN PATENT DOCUMENTS

GB  2405543 A * 3/2005 ........... H04N 13/373

*Primary Examiner* — Tyler W. Sullivan
(74) *Attorney, Agent, or Firm* — Ware, Fressola, Maguire & Barber LLP (57) ABSTRACT

A mobile device has at least two camera lenses for taking a first image and a second image as a stereo-image pair. The mobile device also has an electronic processor for composing a composite image from first image strips compressed from the first image and second image strips compressed from the second image in an interlaced manner. The composite image is conveyed to a display panel so that a viewer can see a 3D image through a parallax separating sheet with parallax separating units. The composite image can also be electronically shifted by haft an image strip to accommodate a viewer with a dominant eye. The shifting can be initiated by a viewer using a switch on the mobile device.

16 Claims, 8 Drawing Sheets

(56) References Cited

U.S. PATENT DOCUMENTS

| | | | |
|---|---|---|---|
| 2013/0300958 A1* | 11/2013 | Matsuhiro | G09G 3/003 349/15 |
| 2016/0378218 A1* | 12/2016 | Lo | G02B 7/005 345/173 |
| 2017/0064282 A1* | 3/2017 | Lo | G02B 30/27 |
| 2017/0295357 A1* | 10/2017 | Yang | H04N 13/296 |
| 2018/0059426 A1* | 3/2018 | Lu | G02B 30/24 |

* cited by examiner

THREE-DIMENSIONAL DISPLAY ADAPTED FOR VIEWERS WITH A DOMINANT EYE

FIELD OF THE INVENTION

The present invention relates generally to 3D display system for display a 3D image and, more specifically, to a mobile device having a 3D display system.

BACKGROUND OF THE INVENTION

Figure 1A:
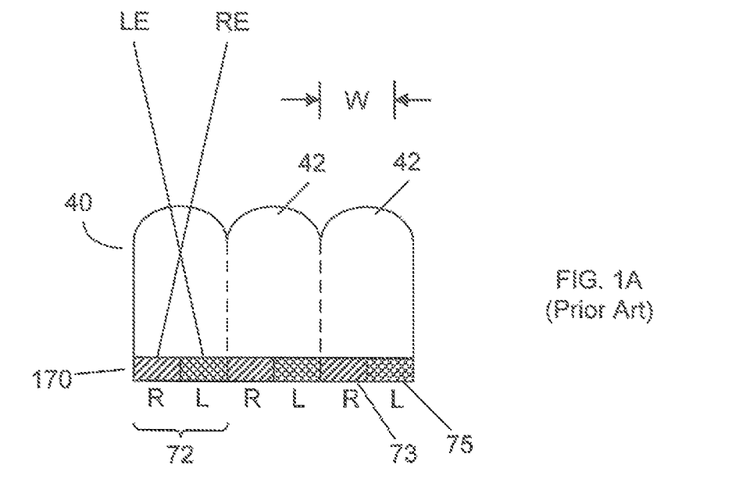
FIG. 1A shows a conventional arrangement of a composite image under a lenticular screen for 3D viewing.
Figure 1B:
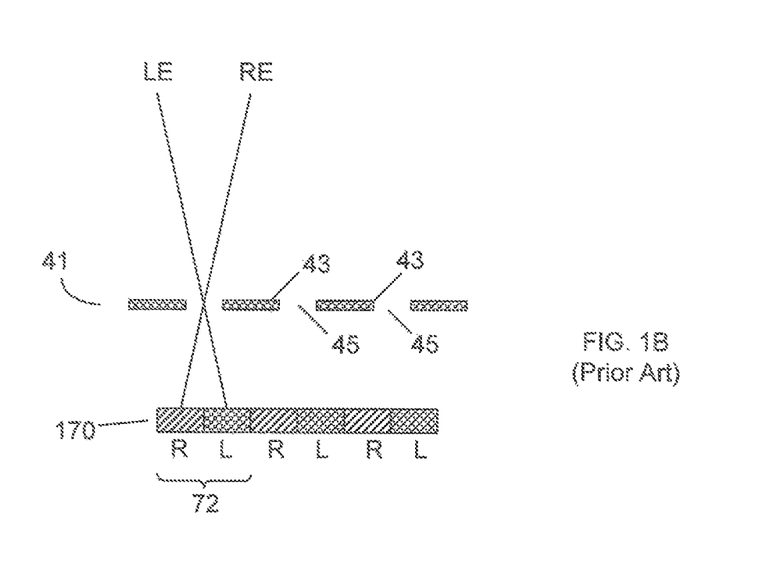
FIG. 1B shows a conventional arrangement of a composite image under a parallax sheet for 3D viewing.
Figure 1C:
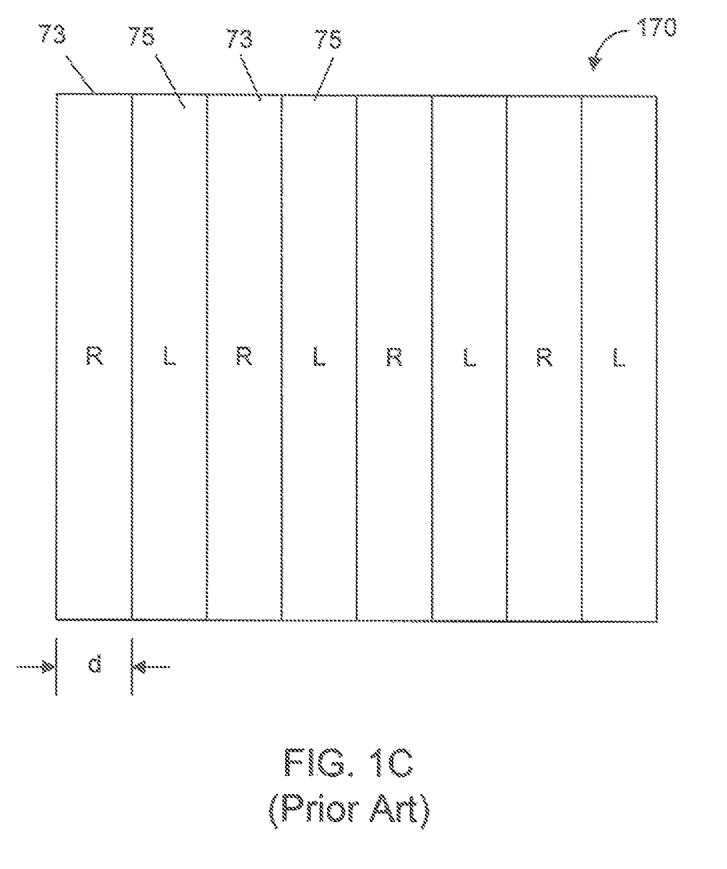
FIG. 1C illustrates a typical composite image.

In a mobile device, such as a mobile phone and a tablet or the like, it is desirable to have a 3D display system on which an image can be viewed in 3D. It is also desirable that the 3D image can be viewed horizontally in a landscape mode or vertically in a portrait mode. As known in the art, a 3D display system has a display panel to display a composite image and a parallax separating sheet placed on top of the display panel for 3D viewing. As shown in FIG. 1A, the composite image 170 is composed of a plurality of right image strips 73 and a plurality of left image strips 75 alternately arranged, and the parallax separating sheet can be a lenticular screen 40 having an array of lenticules 42. The lenticular sheet 40 is arranged such that each lenticule 42 substantially covers a stereo-strip pair 72, or one right image strip and one left image strip to allow the right eye (RE) of a viewer to see the right image strips and the left eye (LE) to see the left image strips. In such arrangement, the right eye sees a right image of a scene and the left eye sees a left image of the same scene. FIG. 1B is similar to FIG. 1A except that the parallax separating sheet in FIG. 1B is a parallax barrier 41 having a plurality of opaque strips 43 and a plurality of clear strips 45. FIG. 1C illustrates a typical composite image 170 having a plurality of right image strips 73 and a plurality of left image strips 75 alternately arranged. Each of the image strips 73, 75 has a strip width d.

SUMMARY OF THE INVENTION

The present invention is concerned with accommodating a viewer with a dominant eye in viewing a 3D display system. The 3D display system can be a stand-alone image display or one integrated with a mobile device. The mobile device can be a mobile phone, a tablet and the like. For example, the mobile device has at least two camera lenses for taking pictures either at a landscape mode or a portrait mode. The mobile device has a plurality of image sensors to capture the images formed by the camera lenses. The mobile device also has an electronic processor configured to retrieve signals indicative of the images from the image sensor and to compose a composite image. The composite image is conveyed to a display panel so that a viewer can see a 3D image through a parallax separating sheet, either in a landscape mode or in a portrait mode. The parallax separating sheet can be a lenticular screen, a parallax barrier or a sheet having a two-dimensional array of lenslets. The 3D image can be displayed to be viewed with viewers with a dominant left eye or displayed to be with a dominant right eye.

Thus, the first aspect of the present invention is a 3D imaging system, comprising:

a display section configured to display a 3D image, the display section comprising a display panel and a parallax sheet disposed over the display panel, the parallax sheet comprising a plurality of parallax separating units, each parallax separating unit has a unit width; and a processor configured to compose a composite image from a plurality of images, said plurality of images comprise a first image and a second image and to convey signals indicative of the composite image to the display panel for displaying a displayed image indicative of the composite image, the display image comprising a plurality of first image strips and second image strips alternately arranged, the first image strips indicative of the first image and the second image strips indicative of the second image, each of the first and second image strips has a strip width substantially equal to one half of the unit width, wherein the 3D imaging system is operable at least in a first display mode and in a second display mode such that when the 3D imaging system is operated in the first display mode, the composite image is arranged such that each of parallax separating unit substantially covers one of the first image strips and one half of each of two second strips adjacent to said one of the first image strips, and when the 3D imaging system is operated in the second display mode, the composite image is rearranged by shifting one strip width relative to the parallax sheet such that each of parallax separating unit substantially covers one of the second image strips and one half of each of two first image strips adjacent to said one of the second image strips.

According to an embodiment of the present invention, the imaging system further comprises: a switch for carrying out said shifting of the composite image relative to the parallax sheet.

According to an embodiment of the present invention, the first image is a right image and the second image is a left image.

According to an embodiment of the present invention, the first image is a left image and the second image is a right image.

According to an embodiment of the present invention, the parallax sheet is a lenticular sheet comprising a plurality of lenticules for providing the parallax separating units.

According to an embodiment of the present invention, the parallax sheet is a parallax barrier comprising a plurality of opaque strips and clear strips alternately arranged for providing the parallax separating units.

According to an embodiment of the present invention, the parallax sheet comprises a two-dimensional array of lenslets, the array including a plurality of lenslet rows arranged in a first direction and a plurality of lenslet columns arranged in a different second direction, and wherein either the lenslet rows or the lenslet columns are arranged to provide the parallax separating units.

According to an embodiment of the present invention, the display panel comprises a plurality of pixel columns and wherein each of the strip widths covers N pixel columns with N being a positive integer equal to or greater than 1.

The second aspect of the present invention is a mobile device which comprises a 3D imaging system and a plurality of cameras, the cameras comprising a first camera configured to capture the first image, and a second camera configured to capture the second image.

According to an embodiment of the present invention, the mobile device further comprises a phone housing having a first housing side and an opposing second housing side, wherein the display section is located on the first housing side and the pair of cameras is located on the second housing side.

According to an embodiment of the present invention, the display section is located on the first housing side and the pair of cameras is also located on the first housing side.

According to an embodiment of the present invention, the mobile device is a mobile phone.

According to an embodiment of the present invention, each of the plurality of parallax separation units has a longitudinal axis, and wherein the first camera and the second camera are disposed adjacent to each other in a direction substantially perpendicular to the longitudinal axis.

According to an embodiment of the present invention, the parallax sheet comprises a two-dimensional array of lenslets, the array including a plurality of lenslet rows arranged in a first direction and a plurality of lenslet columns arranged in a different second direction, and wherein either the lenslet rows or the lenslet columns are arranged to provide the parallax separating units.

The third aspect of the present invention is a method for use in a 3D imaging system, the method comprises:
  providing a switch electrically connected to the processor for carrying out said shifting of the composite image relative to the parallax sheet from the first display mode to the second display mode, the switch operable in a first switching mode and a second switching mode, and
  activating the first switching mode for carrying out said shifting when the first image is a left image, or
  activating the second switching mode for carrying out said shifting when the first image is a right image.

DETAILED DESCRIPTION OF THE INVENTION

Figure 2A:
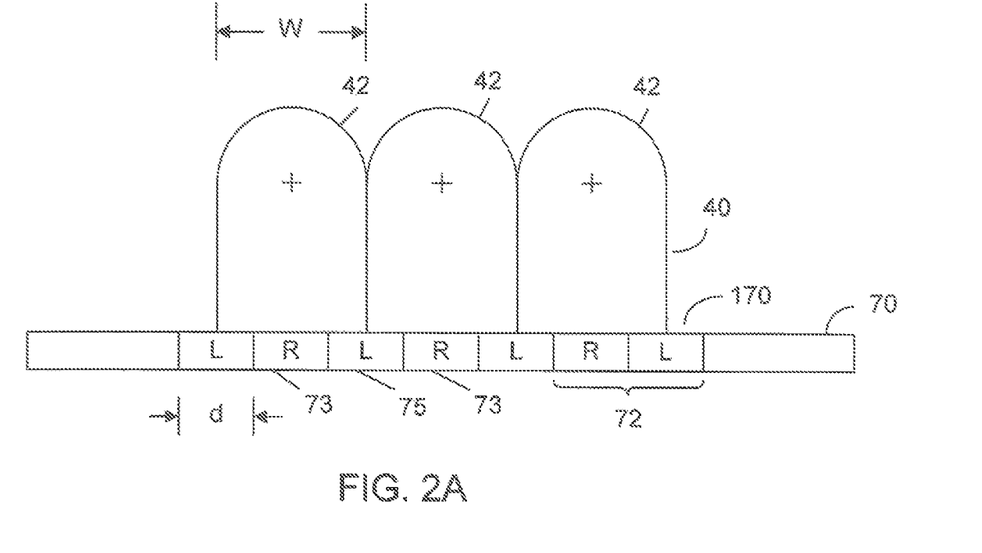
FIG. 2A shows an arrangement of a composite image under a lenticular screen to accommodate a viewer having a dominant right eye, according to an embodiment of the present invention.
Figure 2B:
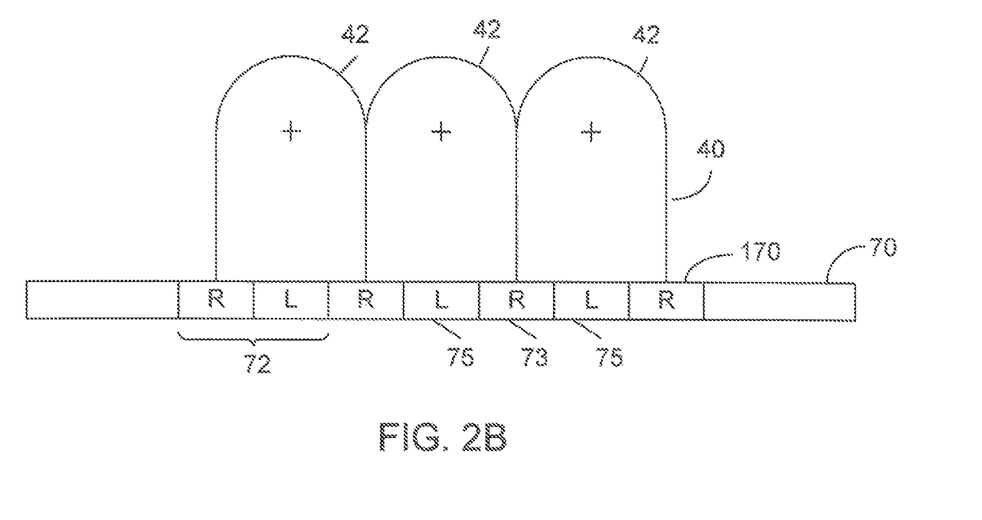
FIG. 2B shows an arrangement of a composite image under a lenticular screen to accommodate a viewer having a dominant left eye, according to an embodiment of the present invention.

The present invention is concerned with an apparatus for presenting a 3D image on a mobile device, such as a mobile phone, a tablet or the like. The mobile device is configured to have a 3D display and necessary electronic components to produce an image to be shown in 3D. According to one embodiment of the present invention, the mobile device has two camera lenses to take a right picture and a left picture of the same scene at two viewing angles or vantage points. The mobile device also has associated image sensors to capture the images formed by the camera lenses. The captured left and right images are processed into a composite image comprising a plurality of left image strips and right image strips alternately arranged. The composite image can be conveyed to a display panel to be viewed through a parallax separating sheet as shown in FIGS. 2A and 2B.

Figure 6:
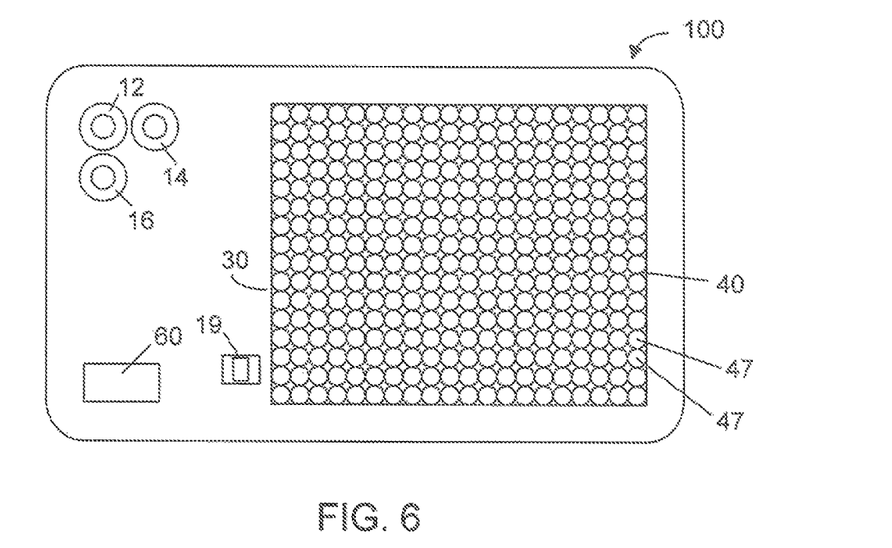
FIG. 6 illustrates a mobile device having a 3D display system configured to accommodate a viewer with a dominant eye, according to yet another embodiment of the present invention.

According to an embodiment of the present invention, the image strips on the composite image 170 can be electronically shifted relative to the parallax separating sheet to suit a viewer having a dominant eye. For example, for a viewer with a dominant right eye, the composite image 170 is arranged as shown in FIG. 2A. For a viewer with a dominant left eye, the composite image 170 is arranged as shown in FIG. 2B. The mobile device comprises a switch to facilitate the shifting of the composite image 170 relative to the parallax separating sheet. The switch can be used to control the 3D display system such that the composite image can be positioned relative to the parallax sheet at least in two modes: 1) a first shifted mode as shown in FIGS. 2A and 2) a second shifted mode as shown in FIG. 2B. It is understood that the parallax separating sheet can be a lenticular screen 40, a parallax barrier 41 or a sheet of lenslets 47 arranged in a two-dimensional array (FIG. 6). The terms lenticular screen and parallax barrier are used herein interchangeably. As illustrated in FIGS. 2A and 2B, the composite image 170 is arranged on a display panel 70, on which the lenticular screen 40 is fixedly mounted. The display panel 70 is configured to display a displayed image indicative of the composite image 170. The composite image 170 comprises a plurality of right image strips 73 and a plurality of left image strips 75 alternately arranged. The right image strips 73 are indicative of a right image and the left image strips are indicative of a left image of a stereo-image pair; and each of the image strips 73, 75 has a strip width d. The strip width d is equal to or slightly greater than half of the width W of the lenticules 42 (see FIG. 2A). The 3D imaging system in the mobile device 100, according to an embodiment of the present invention, is operable at least in a first display mode and in a second display mode such that when the 3D imaging system is operated in the first display mode, the composite image 170 is arranged such that each of parallax separating unit 42 substantially covers one of the right image strips 73 and one half each of two left image strips 75 adjacent to the right image strip 73 as shown in FIG. 2A. When the 3D imaging system is operated in the second display mode, the image strips 73, 75 on the composite image 170 are electronically shifted by one strip width d relative to the lenticular screen 40 (parallax separating sheet) such that each of the lenticules 42 (parallax separating unit) substantially covers one of the left image strips 75 and one haft each of two right image strips 73 adjacent to the left image strip 75 as shown in FIG. 2B. The shifted image strip arrangement as shown in FIG. 2A is intended for a viewer having a dominant right eye. The arrangement as shown in FIG. 2B is intended for a viewer having a dominant left eye.

It should be noted that, according to an embodiment of the present invention, the parallax separating sheet is fixedly mounted on the display panel 70. The shifting of image strips between the first display mode and the second display mode is carried out electronically when the image strips 73, 75 are collectively shifted to the left or to the right.

Figure 3:
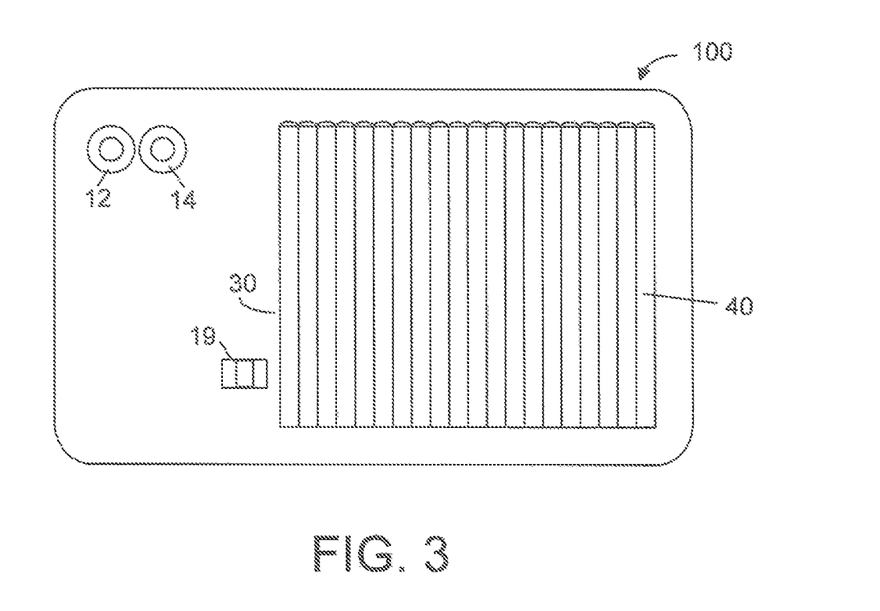
FIG. 3 illustrates a mobile device having a 3D display system configured to accommodate a viewer with a dominant eye, according to an embodiment of the present invention.
Figure 5:
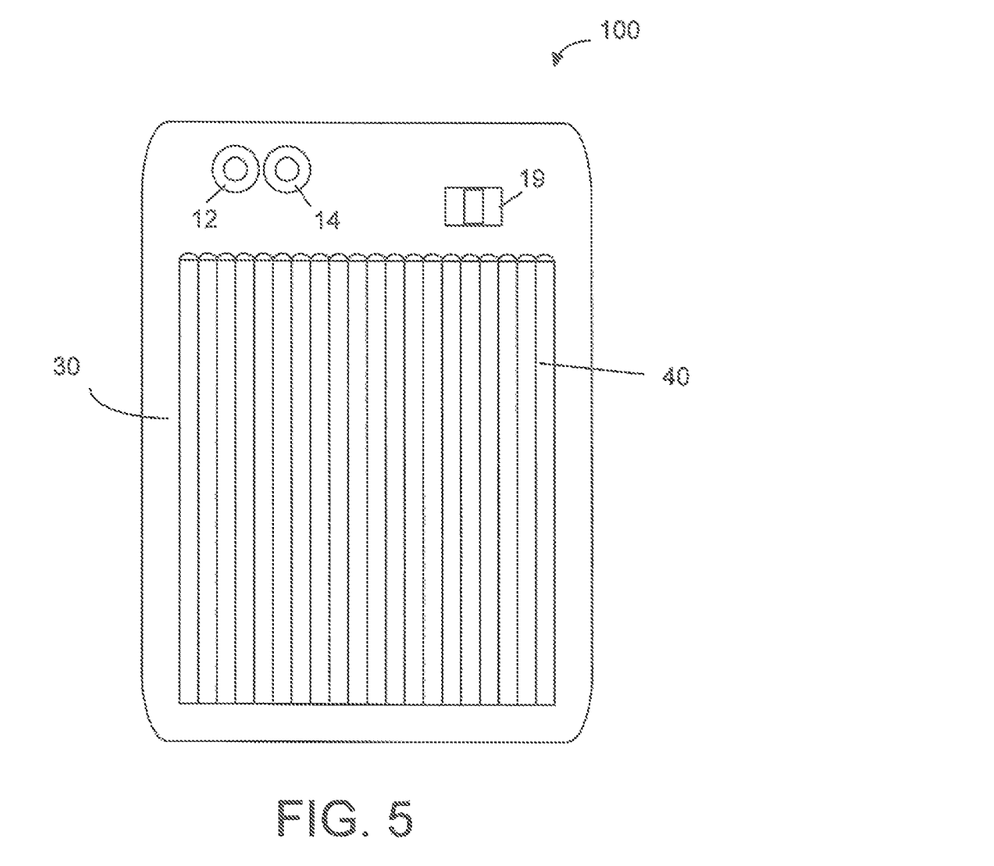
FIG. 5 illustrates a mobile device having a 3D display system configured to accommodate a viewer with a dominant eye, according to another embodiment of the present invention.

As shown in FIG. 3, the mobile device 100 has a plurality of lenses to take pictures of a scene from a plurality of vantage points. For example, the mobile device 100 has two camera lenses 12, 14 to take pictures of a scene from two viewing angles. The camera lenses 12, 14 can be located on the same side of the image display section 30 or on the opposite side. In one embodiment of the present invention, the lenticular screen 40 of the image display section 30 is arranged such that the longitudinal axis of the lenticules is substantially in the vertical direction when the mobile device 100 is held in a horizontal position as shown in FIG. 3. However, the orientation of lenticular screen 40 and the placement of the camera lenses can be arranged differently as shown in FIG. 5. As shown in FIG. 3, the mobile device 100 also comprises a switch 19 which can be used to electronically shift the image strips 73, 75 on the composite image 170 relative to the lenticular screen 40 in a first direction as shown in FIG. 2A or in a second direction as shown in FIG. 2B, to suit a viewer having a dominant eye.

Figure 4:
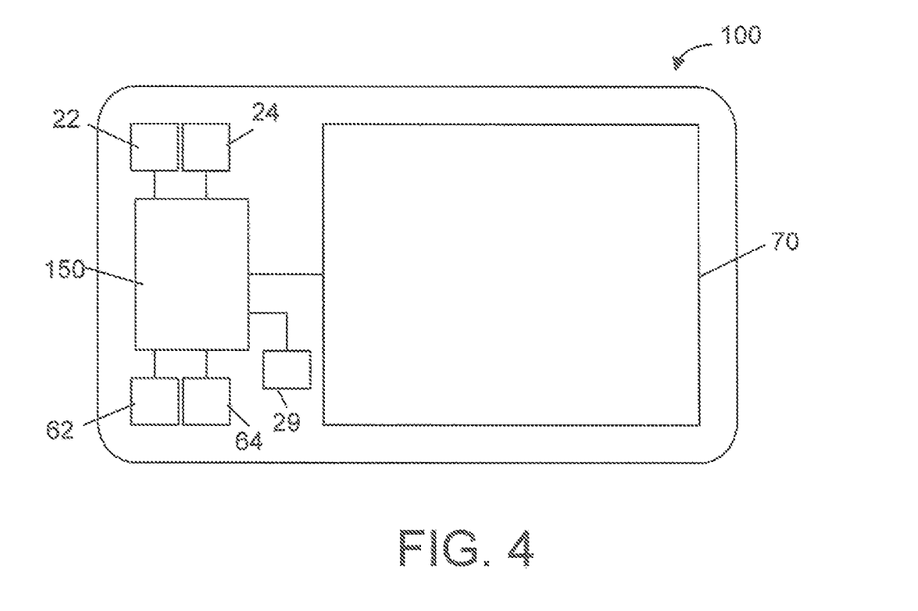
FIG. 4 illustrates the electronic components associated with the 3D display system as shown in FIG. 3.

FIG. 4 shows the image sensors associated with the camera lenses and the display panel associated with the image display section in a mobile device as shown in FIG. 3. As shown in FIG. 4, the mobile device 100 has two image sensors or sensor areas 22, 24 configured to capture the images taken by the camera lenses 12, 14 (FIG. 3). The captured images taken by the camera lenses 12, 14 can be used as a stereo-image pair for 3D viewing. The mobile device 100 has an electronic processor 150 configured to process the image content in the image sensors for displaying on a display panel 70 which is located behind the lenticular screen 40. The mobile device 100 also has necessary electronic memory to store images. As shown in FIG. 4, the mobile device 100 has a memory unit 62 and a memory unit 64 for storing image content of a pair of images for producing a 3D image, for example. With the memory units 62, 64, contents of a stereo-image pair can also be downloaded into the mobile device 100 from an external source. The electronic processor 150 is configured to combine the image content in the image sensors 22, 24 or in the memory units 62, 64 into a composite image 170 to be displayed on the display panel 70. The mobile device 100 also has a sensing area 29 configured to send electronic signals to the signal processor 150 in order to collectively shift the image strips 73, 75 on the composite image 170, in response to the switching action on the switch 19 (FIG. 3). The signal processor 150 is configured to compose a composite image 170 from at least a first image and a second image and to convey electronic signals indicative of composite image 170 to the display panel 70.

It is understood that, the collective shifting of image strips 73, 75 on the composite image 170 is carried out electronically by the signal processor 150, in response to the switching action or the switch position of switch 19 (FIG. 3). According to an embodiment of the present invention, the relative position of the display panel 70 and the lenticular screen 40 remains unchanged.

FIG. 5 illustrates a mobile device 100 having a 3D display system configured to accommodate a viewer with a dominant eye, according to an embodiment of the present invention. In the mobile device 100 as shown in FIG. 5, the lenticular screen 40 of the image display section 30 is arranged such that the longitudinal axis of the lenticules is substantially in the vertical direction when the mobile device 100 is held in a vertical position.

FIG. 6 illustrates a mobile device 100, according another embodiment of the present invention. In the mobile device 100 as shown in FIG. 6, the parallax separating sheet 40 is a two-dimensional array of lenslets 47. The parallax separating sheet 40 can be used to display a 3D image in the vertical direction or in the horizontal direction. The mobile device 100 has three camera lenses 12, 14 and 16 so that a stereo-image pair can be taken when the mobile device 100 is held in a vertical position or in a horizontal direction. The mobile device 100 also has an orientation sensor 60 configured to determine whether the user is taking pictures in the horizontal direction or in the vertical direction so that only images taken by lenses 12, 14 or images taken by lenses 12, 16 will be used for composing the composite image 170.

Figure 7:
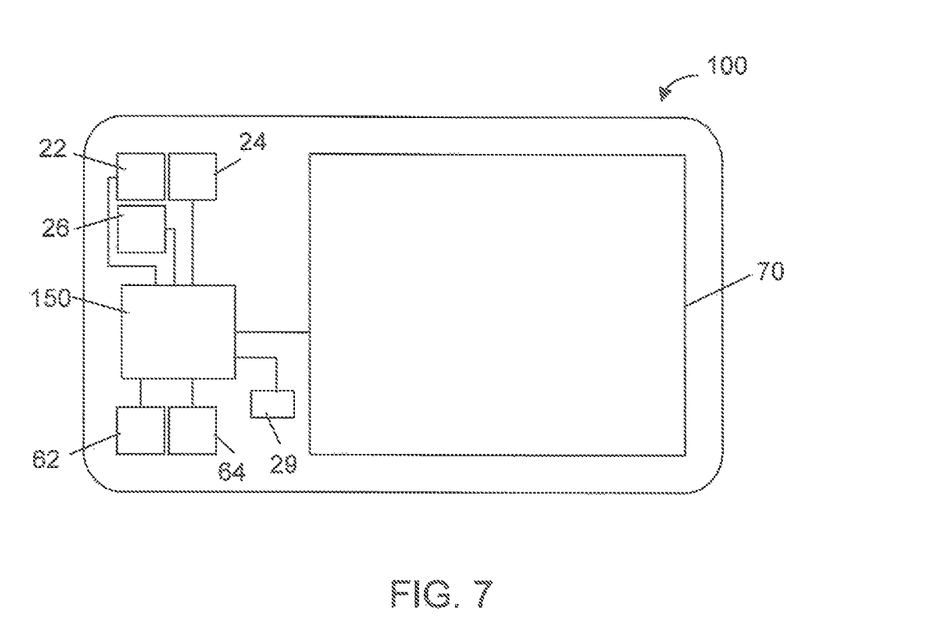
FIG. 7 illustrates the electronic components associated with the 3D display system as shown in FIG. 6.

FIG. 7 illustrates the electronic components associated with the 3D display system as shown in FIG. 6. As shown in FIG. 7, the mobile device 100 has three image sensors or sensor areas 22, 24 and 26 configured to capture the images taken by the associated camera lenses 12, 14 and 16.

In the embodiments as shown in the drawings, a lenticular screen 40 having a plurality of lenticules 42 is used to separate the L, R image strips so that the left eye and the right eye of a viewer can view the corresponding L, R images, for example. It is understood by one of ordinary skill in the art that a lenticular screen, such as the screen 40, is one type of parallax separating sheet. Another type of parallax separating sheet such as a parallax barrier 41 having a plurality of opaque strips 43 can also be to separate the L, R image strips for the same viewing purposes. Therefore, the terms "lenticular screen" and "parallax barrier" may be used interchangeably throughout the specification.

Figure 8A:
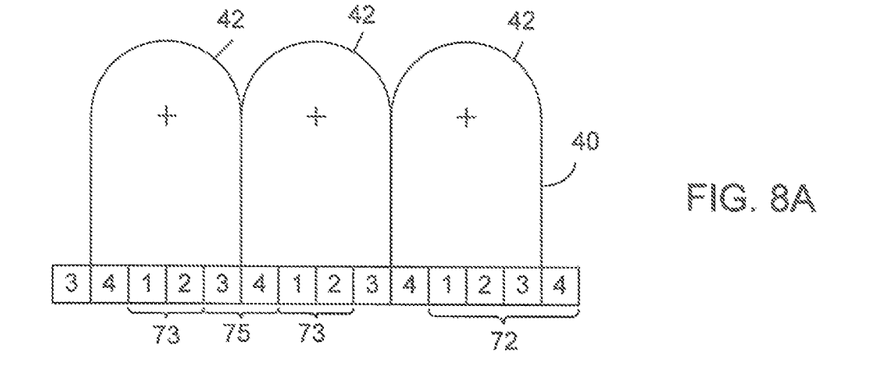
FIGS. 8A and 8B illustrate a 3D display wherein an image strip covers two pixel columns, according to an embodiment of the present invention.
Figure 8B:
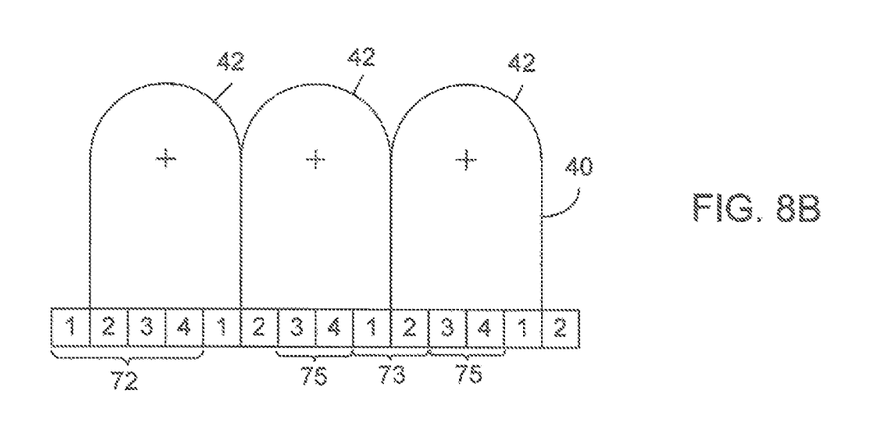

It is understood that the display panel 70 comprises a plurality of pixel columns, the width of each pixel column can be smaller than or equal to the width of an image strips. Each of the image strips may cover one pixel column, or two or more pixel columns. For example, each right image strip 73 may cover two pixel columns 1, 2 and each left image strip 75 may cover two pixel columns 3, 4 as shown in FIGS. 8A and 8B. In that case, four images taken of the same scene at four different viewing angles can be used to compose a composite image.

Figures 9A, 9B, 9C:
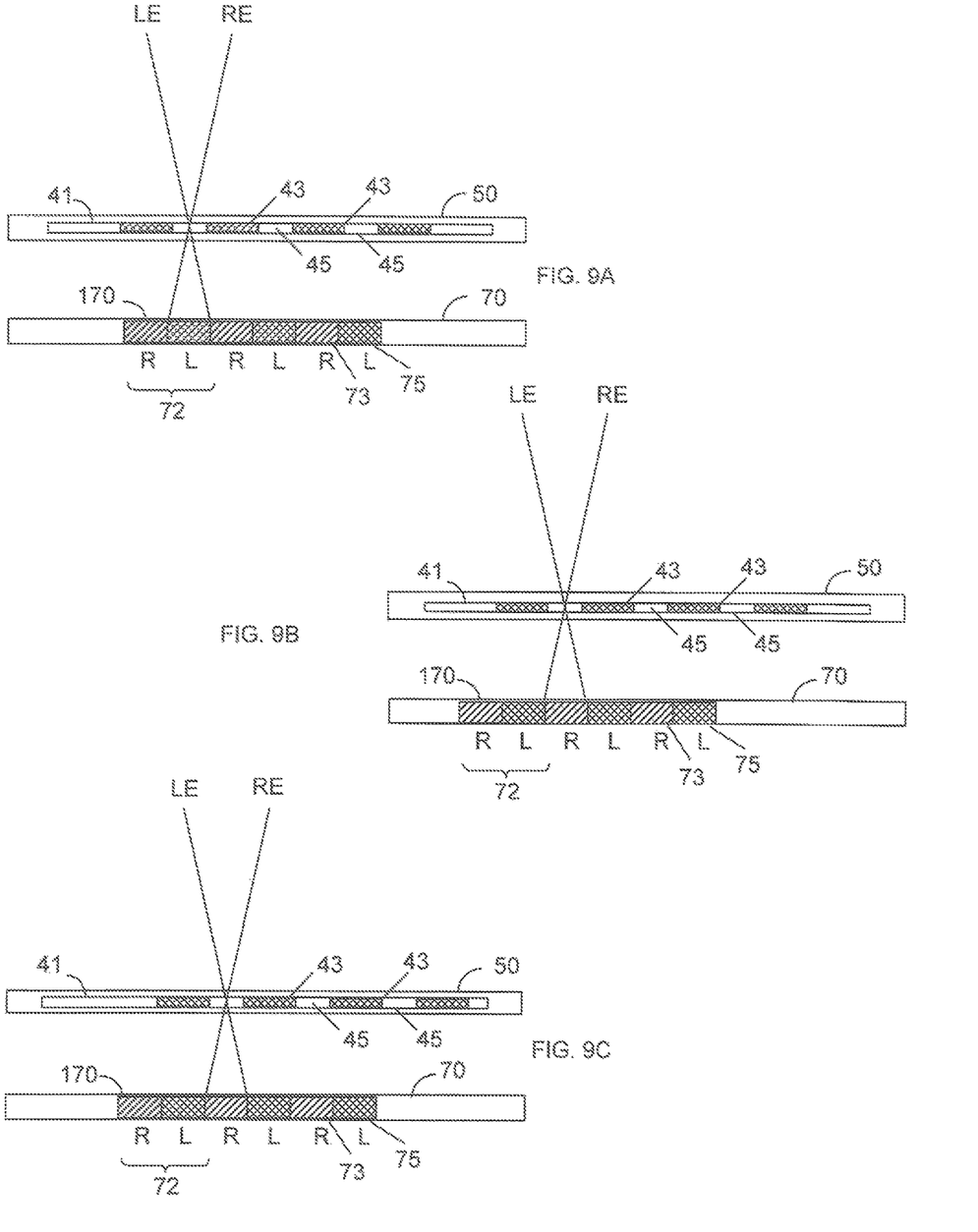
FIGS. 9A-9C illustrates a 3D display wherein the shifting between the parallax barrier and the composite image can be carried out according to different embodiments of the present invention.

FIGS. 9A-9C illustrates a 3D display wherein the shifting between the parallax barrier and the composite image can be carried out according to different embodiments of the present invention. As seen in FIG. 9A, the parallax barrier 41 is formed in a light valve 50 and parallax barrier 41 is positioned relative to the display panel 70 wherein the composite image 170 is arranged to be viewed by a viewer with a dominant left eye (LE). According to an embodiment of the present invention, the composite image 170 is electronically shifted by one strip width so that the display image can be viewed by a viewer with a dominant right eye (RE), as shown in FIG. 9B. According to another embodiment of the present invention, the parallax barrier 41 is electronically shifted in the light valve 50 so that the display image can be viewed by a viewer with a dominant right eye (RE), as shown in FIG. 9C. The light valve 50 can be a liquid crystal panel, for example. It is understood that the parallax barrier can be a mechanical device or an optical device where the positions of the opaque strips 43 and the clear strips 45 are fixed. In that case, the shifting is carried out in the composite image as shown in FIG. 9B. An optical parallax barrier can be made from a clear substrate with the opaque strips painted or printed, for example.

Furthermore, the display panel 70 can be a liquid crystal display (LCD) panel, an organic light-emitting diode (OLED) display panel or the like.

According to an embodiment of the present invention, the mobile device 100 as shown in FIGS. 3, 5 and 6 also uses the display section 30 as an information display to allow a user to view information or 2-dimensional picture to enter information. In another embodiment, the mobile device 100 has a different display panel for 2D usage.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A 3D imaging system, comprising:
   a display section comprising a display panel and a parallax sheet disposed over the display panel, the parallax sheet comprising a plurality of parallax separating units, each parallax separating unit has a unit width;
   an electronic processor arranged to compose a composite image from a plurality of images, said plurality of images comprise a first image and a second image and to convey signals indicative of the composite image to the display panel for displaying a displayed image indicative of the composite image, the composite image comprising composite image strips including a plurality of first image strips and second image strips alternately arranged, the first image strips indicative of the first image and the second image strips indicative of the second image, each of the first and second image strips has a strip width substantially equal to one half of the unit width, wherein the 3D imaging system is operable at least in a first display mode and in a second display mode, and
   a switch having a sensor area electronically linked to the electronic processor, the switch having a switch position operable to cause the electronic processor to change relative position between the composite image strips of the composite image and the parallax separating units of the parallax sheet for switching the 3D imaging system between the first display mode and the second display mode, wherein when the 3D imaging system is operated in the first display mode, the composite image is arranged such that each of parallax separating units substantially covers one of the first image strips and one half of each of two second image strips adjacent to said one of the first image strips, and when the 3D imaging system is operated in the second display mode, the electronic processor is caused to carry out an electronic shifting of the relative position between the composite image strips of the composite image and the parallax separating units of the parallax sheet such that each of parallax separating unit substantially covers one of the second image strips and one half of each of two first image strips adjacent to said one of the second image strips.

2. The 3D imaging system according to claim 1, where the first image is a right image and the second image is a left image.

3. The 3D imaging system according to claim 1, wherein the first image is a left image and the second image is a right image.

4. The 3D imaging system according to claim 1, wherein the parallax sheet is a lenticular sheet comprising a plurality of lenticules for providing the parallax separating units, and said shifting is carried out electronically to cause the composite image to shift relative to the parallax sheet.

5. The 3D imaging system according to claim 1, wherein the parallax sheet is a parallax barrier comprising a plurality of opaque strips and clear strips alternately arranged for providing the parallax separating units, and wherein said shifting is carried out electronically to cause the composite image to shift relative to the parallax barrier.

6. The 3D imaging system according to claim 1, wherein the parallax sheet is a light valve forming a parallax barrier comprising a plurality of opaque strips and clear strips alternately arranged for providing the parallax separating units, and wherein said shifting is carried out electronically to cause the parallax barrier to shift relative to the composite image.

7. The 3D imaging system according to claim 1, wherein the parallax sheet comprises a two-dimensional array of lenslets, the array including a plurality of lenslet rows arranged in a first direction and a plurality of lenslet columns arranged in a different second direction, and wherein either the lenslet rows or the lenslet columns are arranged to provide the parallax separating units.

8. The 3D image system according to claim 1, wherein the display panel comprises a plurality of pixel columns and wherein each of the image strips covers N pixel columns with N being a positive integer equal to or greater than 1.

9. The 3D imaging system according to claim 1, wherein the display panel comprises a liquid-crystal display panel.

10. The 3D image system according to claim 1, wherein the display panel comprises an organic light-emitting display panel.

11. A mobile device comprising:
    a 3D imaging system according to claim 1, and
    a plurality of cameras, the cameras comprising a first camera configured to capture the first image, and a second camera configured to capture the second image.

12. The mobile device according to claim 11, further comprising:
    a phone housing having a first housing side and an opposing second housing side, wherein the display section is located on the first housing side and the pair of cameras is located on the second housing side.

13. The mobile device according to claim 11, further comprising:
    a phone housing having a first housing side and an opposing second housing side, wherein the display section is located on the first housing side and the pair of cameras is also located on the first housing side.

14. The mobile device according to claim 11, comprising a mobile phone.

15. The mobile device according to claim 11, wherein each of the plurality of parallax separating units has a longitudinal axis, and wherein the first camera and the second camera are disposed adjacent to each other in a direction substantially perpendicular to the longitudinal axis.

16. The mobile device according to claim 11, wherein the parallax sheet comprises a two-dimensional array of lenslets, the array including a plurality of lenslet rows arranged in a first direction and a plurality of lenslet columns arranged in a different second direction, and wherein either the lenslet rows or the lenslet columns are arranged to provide the parallax separating units.

* * * * *